United States Patent
Mukai et al.

(10) Patent No.: US 9,878,388 B2
(45) Date of Patent: Jan. 30, 2018

(54) ELECTROCHEMICAL MACHINING TOOL, ELECTROCHEMICAL MACHINING SYSTEM, AND PERFORATED MEMBER MANUFACTURING METHOD

(71) Applicant: MITSUBISHI HEAVY INDUSTRIES, LTD., Tokyo (JP)

(72) Inventors: Yosuke Mukai, Tokyo (JP); Kazuhisa Tamura, Tokyo (JP); Shin Asano, Tokyo (JP); Tetsuhei Kobayashi, Tokyo (JP); Tomofumi Shintani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 442 days.

(21) Appl. No.: 14/443,754

(22) PCT Filed: Dec. 4, 2013

(86) PCT No.: PCT/JP2013/082567
§ 371 (c)(1),
(2) Date: May 19, 2015

(87) PCT Pub. No.: WO2014/091981
PCT Pub. Date: Jun. 19, 2014

(65) Prior Publication Data
US 2015/0273602 A1   Oct. 1, 2015

(30) Foreign Application Priority Data
Dec. 12, 2012   (JP) .................................. 2012-271436

(51) Int. Cl.
B23H 3/04      (2006.01)
B23H 9/14      (2006.01)
(Continued)

(52) U.S. Cl.
CPC .............. *B23H 3/04* (2013.01); *B23H 7/265* (2013.01); *B23H 7/30* (2013.01); *B23H 9/10* (2013.01); *B23H 9/14* (2013.01); *B23H 9/16* (2013.01)

(58) Field of Classification Search
CPC .............. B23H 3/04; B23H 9/14; B23H 9/16
See application file for complete search history.

(56) References Cited

U.S. PATENT DOCUMENTS 5,059,289 A    10/1991   Gaskell
9,403,227 B2 *  8/2016   Tamura ..................... B23H 9/14
(Continued)

FOREIGN PATENT DOCUMENTS

CN      101015874      8/2007
DE      199 29 023      9/2000
(Continued)

OTHER PUBLICATIONS

Notice of Allowance dated Aug. 17, 2016 in corresponding Korean Application No. 10-2015-7013407 (with English translation).
(Continued)

*Primary Examiner* — Nicholas A Smith
(74) *Attorney, Agent, or Firm* — Wenderoth, Lind & Ponack, L.L.P.

(57) ABSTRACT

The present invention is an electrochemical machining tool equipped with a tool body that comprises: an electrode that extends along an axial line and inside which a flow channel through which an electrolytic solution flows towards the tip end is formed; an insulating layer covering the outer circumferential surface of the electrode so as to expose the tip end face of the electrode; and a flow channel-partitioning part for partitioning the flow channel into a first flow channel containing the axial line and a second flow channel positioned on the outer circumferential side of the first flow (Continued)

channel. The electrochemical machining tool has a configuration in which a fluid outflow section for directing electrolytic solution, which is flowing through the second flow channel, outward in the radial direction of the tool body is formed on a portion of the circumference of the tool body.

6 Claims, 3 Drawing Sheets

(51) Int. Cl.
*B23H 9/16* (2006.01)
*B23H 7/26* (2006.01)
*B23H 9/10* (2006.01)
*B23H 7/30* (2006.01)

(56) References Cited

U.S. PATENT DOCUMENTS

2009/0134136 A1 5/2009 Graichen
2011/0070096 A1 3/2011 Wei et al.

FOREIGN PATENT DOCUMENTS

| GB | 1130561 | | 10/1968 | |
| GB | 1130561 | A * | 10/1968 | ............... B23H 9/14 |
| JP | 50-33025 | | 10/1975 | |
| JP | 2011-62811 | | 3/2011 | |
| JP | 2011-177819 | | 9/2011 | |
| JP | 2012-35369 | | 2/2012 | |

OTHER PUBLICATIONS

First Office Action dated Mar. 3, 2016 in corresponding Chinese Application No. 201380056451.0 (with English translation).
International Search Report dated Mar. 11, 2014 in corresponding International Application No. PCT/JP2013/082567 (with English translation).
Written Opinion of the International Searching Authority dated Mar. 11, 2014 in corresponding International Application No. PCT/JP2013/082567 (with English translation).

* cited by examiner

ELECTROCHEMICAL MACHINING TOOL, ELECTROCHEMICAL MACHINING SYSTEM, AND PERFORATED MEMBER MANUFACTURING METHOD

TECHNICAL FIELD

The present invention relates to an electrochemical machining tool that, by causing an electric current to be passed between an electrode and a workpiece via an electrolytic solution, electrolyzes and machines the workpiece, and to an electrochemical machining system provided with the electrochemical machining tool.

This application claims priority to Japanese Patent Application No. 2012-271436 filed Dec. 12 2012, the content of which is incorporated herein by reference.

BACKGROUND ART

In difficult-to-machine materials where mechanical machining to machine holes is difficult, machining is generally performed using an electrochemical machining method or an electrodischarge machining method. In particular, when machining holes in a difficult-to-machine material having a high aspect ratio, it is preferable to use the electrochemical machining method.

For example, in a turbine blade of a gas turbine, cooling holes are formed that circulate a coolant, which cools the turbine blade. In order to realize optimal design in terms of thermal and aerodynamic performance, that is, in order to efficiently cool parts that reach a high temperature, such as a blade profile part and a platform etc., it is preferable for a shape of the cooling hole to be curved along a geometrical shape of the turbine blade.

Here, Patent Document 1 discloses, for example, an electrochemical machining assembly that is capable of forming a curved hole in a workpiece using a curved electrode.

CITATION LIST

Patent Literature

Patent Document 1: Japanese Unexamined Patent Application Publication No. 2011-62811A

SUMMARY OF THE INVENTION

Technical Problem

However, in the device disclosed in Patent Document 1, as the machining is performed using the curved electrode, it is not possible to machine both a curved hole and a straight hole using the same electrode. In particular, when machining cooling holes along a surface of a turbine profile, it is necessary to perform machining while changing a curve ratio of a curved hole or to perform machining in which a curved hole and a straight hole are combined.

The present invention provides an electrochemical machining tool that is capable of easily forming a curved hole and a straight hole of a desired shape, an electrochemical machining system and a perforated member manufacturing method.

Solution to Problem

An electrochemical machining tool according to a first aspect of the present invention is provided with a tool body that includes: an electrode formed of a flexible electroconductive material in a tube shape that extends along an axial line and having an inside formed with a flow channel along which an electrolytic solution flows toward a tip end side; an insulating layer for covering an outer circumferential surface of the electrode such that a tip end face of the electrode is exposed; and a flow channel partitioning part for partitioning the flow channel into a first flow channel that includes the axial line and a second flow channel that is positioned on an outer circumferential side of the first flow channel. A fluid outflow section for directing the electrolytic solution flowing through the second flow channel outward in the radial direction of the tool body is formed on a portion of the circumference of the tool body.

According to this type of the electrochemical machining tool, the electrolytic solution flows through the flow channel inside the electrode and is directed to flow out from the tip end of the electrode. By causing an electric current to pass between a tip end face of the electrode and an inner surface of a machined hole of a workpiece via the electrolytic solution, the workpiece is electrolyzed and the machined hole is machined more deeply. The electrolytic solution is directed outward in the radial direction from the fluid outflow section, and the outwardly flowing electrolytic solution imparts a hydrodynamic force to the inner surface of the machined hole. By this, a reaction force to the hydrodynamic force is imparted to the tool body and the tool body is displaced so as to bend in the direction of the reaction force.

Here, the flow channel partitioning part is provided in the tool body. By partitioning the flow channel inside the electrode into the first flow channel and the second flow channel, it becomes possible to cause the electrolytic solution to flow through the first flow channel and the second flow channel independently. Further, as the fluid outflow section communicates with the second flow channel, by increasing and decreasing a flow amount of the electrolytic solution that is caused to flow through the second flow channel, it is possible to adjust an outflow amount of the electrolytic solution from the fluid outflow section of the tool body. As a result, an amount of displacement of the tool body can be easily adjusted.

In addition, the electrochemical machining tool according to a second aspect of the present invention is further provided with a plug part, which is provided inside the electrode according to the above-described first aspect and which blocks the second flow channel. The fluid outflow section may be formed further to a rear end side of the tool body than the plug part.

By providing this type of the plug part, the flow amount of the electrolytic solution that is caused to flow through the second flow channel becomes equivalent to the flow amount of the electrolytic solution that is directed outward in the radial direction from the fluid outflow section. As a result, the adjustment of the outflow amount of the electrolytic solution directed to flow out of the fluid outflow section is more easily performed. Thus, it is possible to control the reaction force to the hydrodynamic force that is imparted to the tool body and it is possible to even more easily form a curved hole and a straight hole of a desired shape.

In addition, an electrochemical machining system according to a third aspect of the present invention is provided with: the electrochemical machining tool according to the above-described first or second aspect; a guide part that guides the electrochemical machining tool in a predetermined advancing direction with respect to a workpiece; a movement mechanism that causes the electrochemical machining tool to advance; and an electrolytic solution supply part that supplies the electrolytic solution independently to each of the first flow channel and the second flow channel.

According to this type of the electrochemical machining system, in the electrochemical machining tool, it is possible to cause the electrolytic solution to flow independently through the first flow channel and the second flow channel by providing the flow channel partitioning part in the tool body. As a result, by increasing and decreasing the flow amount of the electrolytic solution flowing through the second flow channel, and thus adjusting the outflow amount from the fluid outflow section, it is possible to easily adjust the displacement amount of the tool body. Thus, it is possible to easily form a curved hole and a straight hole of a desired shape.

Furthermore, a perforated member manufacturing method according to a fourth aspect of the present invention uses the electrochemical machining tool according to the above-described first aspect or second aspect to form a machined hole in a workpiece.

According to this type of the perforated member manufacturing method, by using the electrochemical machining tool to increase and decrease the flow amount of the electrolytic solution flowing through the second flow channel and thus to adjust the outflow amount from the fluid outflow section, it is possible to easily adjust the displacement amount of the tool body. Thus, it is possible to easily form a curved hole and a straight hole of a desired shape.

Advantageous Effects of Invention

According to the above-described electrochemical machining tool, electrochemical machining system and perforated member manufacturing method, a first flow channel and a second flow channel are partitioned in a tool body, and a fluid outflow section communicates with the second flow channel. As a result, it is possible to easily form a curved hole and a straight hole of a desired shape.

DESCRIPTION OF EMBODIMENTS

First Embodiment

An electrochemical machining system 1 according to a first embodiment of the present invention will be described below. The electrochemical machining system 1 is a device to form machined holes 101 in a workpiece 100. As an example of the present embodiment, the workpiece 100 is a turbine blade of a gas turbine, and the machined hole 101 of the workpiece 100 is a cooling hole to cool the turbine blade.

Hereinafter, a manufacturing method of the workpiece 100 that has the machined hole 101, that is, a manufacturing method of a perforated member will be also described.

Figure 1:
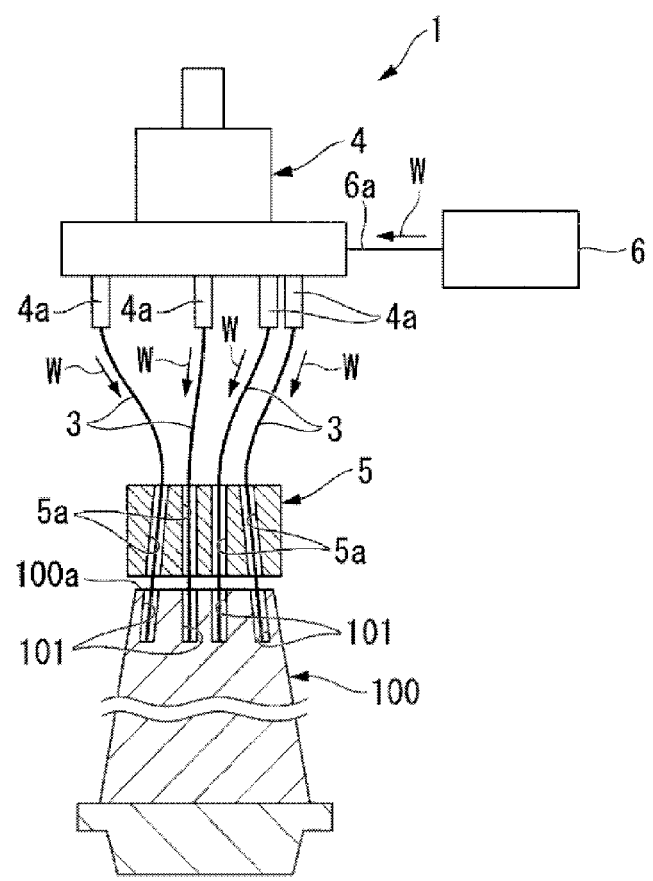
FIG. 1 is a front view illustrating an electrochemical machining system according to a first embodiment of the present invention.

As illustrated in FIG. 1, the electrochemical machining system 1 is provided with a plurality of electrochemical machining tools 3 that form the machined holes 101 in the workpiece 100, a movement mechanism 4 that causes the electrochemical machining tools 3 to advance, a guide part 5 that guides the electrochemical machining tools 3 when the electrochemical machining tools 3 are caused to advance, and an electrolytic solution supply part 6 that supplies an electrolytic solution W (refer to FIG. 2A) to the electrochemical machining tools 3. Note that the electrochemical machining system 1 is not limited to the configuration having the plurality of the electrochemical machining tools 3, and may be configured such that it is provided with the single electrochemical machining tool 3.

The movement mechanism 4 is disposed on the side of a tip end 100a of the turbine blade, which is the workpiece 100. The movement mechanism 4 allows the electrochemical machining tools 3 to advance and retreat with respect to the tip end 100a.

The movement mechanism 4 causes the electrochemical machining tools 3 to advance and retreat using a drive source, such as an electric motor (not illustrated in the drawings), for example.

On a surface on the workpiece 100 side, the movement mechanism 4 has a plurality of holding parts 4a that hold a base end (a base end 10b that will be described later) of each of the electrochemical machining tools 3. The holding part 4a has a cylindrical shape that is hollow on the inside. The base end of the electrochemical machining tool 3 is inserted into one end side of the holding part 4a and the electrochemical machining tool 3 is thus held.

The electrolytic solution supply part 6 is a pump or the like, and is connected to the other end side of the holding parts 4a of the movement mechanism 4 via an electrolytic solution flow channel 6a. The electrolytic solution W is supplied to the inside of the holding parts 4a via the electrolytic solution flow channel 6a. A supply amount of the electrolytic solution W is adjusted as desired using a flow amount control device that is not illustrated in the drawings. Sulfuric acid, nitric acid, a saline solution or the like is used as the electrolytic solution W, for example.

The guide part 5 is disposed between the movement mechanism 4 and the tip end 100a of the workpiece 100 (a tip shroud of the turbine blade). When the electrochemical machining tool 3 is caused to advance or retreat by the movement mechanism 4, the guide part 5 guides the electrochemical machining tool 3 in a predetermined advancing direction with respect to the tip end 100a of the workpiece 100. A plurality of guide holes 5a are drilled in the guide part 5 such that the movement mechanism 4 side and the workpiece 100 side communicate with each other. The electrochemical machining tools 3 are respectively inserted through the guide holes 5a from the movement mechanism 4 side toward the workpiece 100 side. Then, by the electrochemical machining tools 3 being caused to advance by the movement mechanism 4 in this state, it is possible to insert the electrochemical machining tools 3 to a desired position with respect to the tip end 100a of the workpiece 100 and at a desired angle with respect to the tip end 100a according to the arrangement of the guide holes 5a.

Next, the electrochemical machining tool 3 will be described.

Figure 2A:
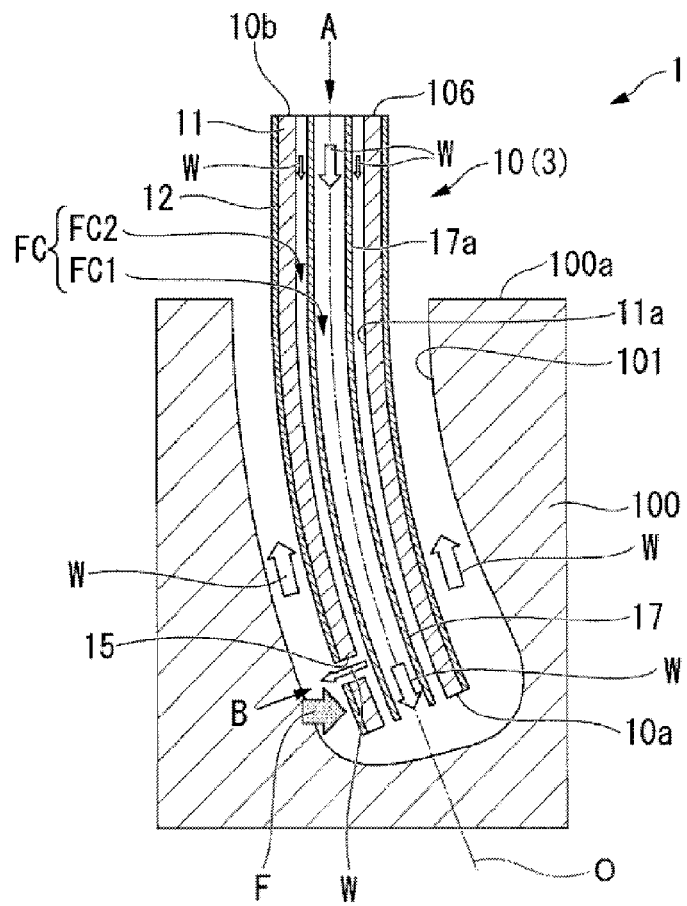
FIG. 2A is a longitudinal cross-sectional view of an electrochemical machining tool in the electrochemical machining system according to the first embodiment of the present invention, and a workpiece.
Figure 2B:
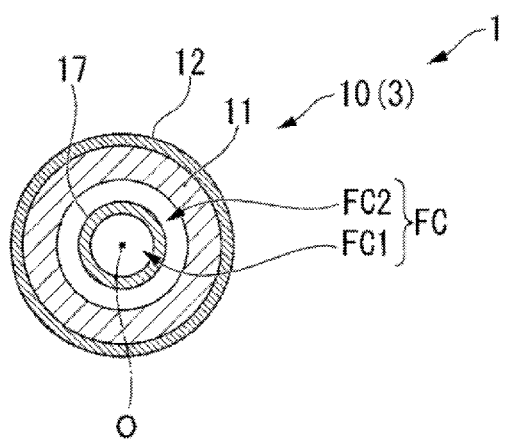
FIG. 2B is a diagram illustrating the electrochemical machining tool of the electrochemical machining system according to the first embodiment of the present invention, as seen in the direction of an arrow A illustrated in FIG. 2A.

As illustrated in FIG. 2A and FIG. 2B, the electrochemical machining tool 3 forms the machined hole (the cooling hole of the turbine blade) 101 in the workpiece 100 by electrochemical machining. The electrochemical machining tool 3 has an electrode 11 and an insulating layer 12 that covers an outer circumference of the electrode 11, and is provided with a tool body 10 that has an overall tube shape.

The electrode 11 in the tool body 10 forms a tube shape that extends along an axial line O. The electrode 11 is formed of a flexible electroconductive material, such as stainless steel, copper, titanium or the like. A space is formed on the inside of a hollow portion inside the electrode 11 (the inside of the electrode 11), which communicates with the inside of the holding part 4a of the movement mechanism 4. This space forms a flow channel FC. The electrolytic solution W that is supplied to the electrochemical machining flows in from the inside of the holding part 4a and flows through the flow channel FC. In this way, the electrolytic solution W flows from the side of the base end 10b that forms a rear end side of the tool body 10 (the movement mechanism 4 side) toward the side of the tip end 10a (the workpiece 100 side).

Further, an end face of the electrode 11 on the tip end 10a side forms a flat shape that is orthogonal to the axial line O or forms a tapered shape (in the present embodiment, it is the flat shape). In the present embodiment, the electrode 11 is a circular tube shape, but it may be a polygonal cylindrical shape that has a polygonal cross-section, for example.

The insulating layer 12 of the tool body 10 is formed, for example, of a polyester resin or the like that has electrical insulating properties. The insulating layer 12 covers an outer circumferential surface of the electrode 11. However, the end face of the electrode 11 on the tip end 10a side is not covered by the insulating layer 12 and the electrode 11 is exposed.

A fluid outflow section 15 is formed on a portion of the circumference of the tool body 10 that has this type of the electrode 11 and the insulating layer 12. The fluid outflow section 15 directs the electrolytic solution W, which is flowing through the flow channel FC on the inside of the electrode 11, outward in the radial direction of the tool body 10.

Figure 2C:
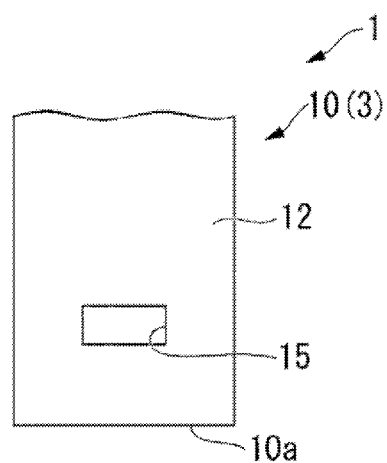
FIG. 2C is a diagram illustrating the electrochemical machining tool of the electrochemical machining system according to the first embodiment of the present invention, as seen in the direction of an arrow B illustrated in FIG. 2A.

In the present embodiment, a hole portion that penetrates the electrode 11 and the insulating layer 12 in the radial direction and that causes the inside and the outside of the tool body 10 to communicate, is adopted as the fluid outflow section 15. A shape of the fluid outflow section 15 as seen from the radial direction of the tool body 10 is a rectangular shape whose sides are formed by line segments extending in the circumferential direction and the axial line O direction, as illustrated in FIG. 2C. The shape of this hole portion is not limited to the rectangular shape and may be another shape, such as a circular or a square shape, for example. Further, although in the present embodiment it is preferable for the fluid outflow section 15 to be formed in a position closer to the tip end 10a of the tool body 10, the position of the fluid outflow section 15 is not limited to this position.

The tool body 10 further includes an inner tube member (a flow channel-partitioning part) 17 that is disposed on the inside of the electrode 11.

In a similar manner to the electrode 11, the inner tube member 17 extends along the axial direction O, and forms a tube shape having substantially the same dimensions in the axial direction O as the electrode 11. The inner tube member 17 is formed of a flexible electroconductive material, such as stainless steel, copper, titanium or the like. The inner tube member 17 is supported on an inner circumferential surface 11a of the electrode 11 by ribs or the like, for example, such that the inner tube member 17 is in a state of being separated from the inner circumferential surface 11a in the radial direction.

Although not illustrated in the drawings, the ribs are provided, for example, so as to protrude from the inner circumferential surface 11a of the electrode 11 inward in the radial direction, with spaces in the axial line O direction and the circumferential direction, and are fixed to an outer circumferential surface 17a of the inner tube member 17.

This inner tube member 17 is not limited to the case of being formed of the electroconductive material, but it is preferable that it is formed of the electroconductive material, such that electrochemical effects on the tip end 10a side are also obtained by the inner tube member 17. Further, in the present embodiment, the inner tube member 17 is a circular tube shape, but it may be a polygonal cylindrical shape that has a polygonal cross-section, for example.

This type of the inner tube member 17 partitions the flow channel FC that is formed inside the electrode 11 into a first flow channel FC1 and a second flow channel FC2. Specifically, the first flow channel FC1 is a cylinder-shaped hollow space that centers around and includes the axial line O. In addition, the second flow channel FC2 is a ring-shaped hollow space that is formed between the outer circumferential surface 17a of the inner tube member 17 and the inner circumferential surface 11a of the electrode 11, and that centers around the axial line O.

Thus, the fluid outflow section 15 allows the second flow channel FC2 to communicate with the outside of the tool body 10.

Then, the electrolytic solution W is supplied from the above-described electrolytic solution supply part 6 to the first flow channel FC1 and the second flow channel FC2 while the flow amounts to each are independently controlled, and the electrolytic solution W flows through the first flow channel FC1 and the second flow channel FC2, respectively.

In this type of the electrochemical machining system 1, the electrolytic solution W is directed to flow out from the tip end 10a of the tool body 10 via the first flow channel FC1 and the second flow channel FC2, by the electrochemical machining tool 3. Then, via the outflowing electrolytic solution W, an electric current is caused to pass between the end face of the tip end 10a of the tool body 10 and an inner surface of the machined hole 101 of the workpiece 100. As a result, the workpiece 100 is electrolyzed and the machined hole 101 is more deeply machined in the axial line O direction.

Here, the electrolytic solution W that is supplied from the electrolytic solution supply part 6 and that flows through the first flow channel FC1 is directed to flow out directly toward the workpiece 100 from the tip end 10a of the tool body 10. Meanwhile, of the electrolytic solution W that flows through the second flow channel FC2 some is directed from the fluid outflow section 15 outwardly in the radial direction. That is to say, some is directed to flow out from the tool body 10 toward the inner surface of the machined hole 101 of the workpiece 100. A remainder of the electrolytic solution W that is not directed to flow out from the fluid outflow section 15 is directed out toward the workpiece 100 from the tip end 10a of the tool body 10.

Then, the electrolytic solution W that is directed out from the fluid outflow section 15 imparts a hydrodynamic force that acts on the inner surface of the machined hole 101. In this manner, a reaction force F to the hydrodynamic force is imparted to the tool body 10, and the tool body 10 is displaced so as to bend in the direction of the reaction force F.

Here, by providing the inner tube member 17, the flow channel FC is partitioned into the first flow channel FC1 and the second flow channel FC2. Then, the electrolytic solution W can be supplied independently to the first flow channel FC1 and the second flow channel FC2 by the electrolytic solution supply part 6. As a result, it becomes possible to independently control the flow amount of the electrolytic solution W to each of the first flow channel FC1 and the second flow channel FC2.

Thus, by increasing the flow amount of the electrolytic solution W to the second flow channel FC2, for example, it is possible to increase the outflow amount of the electrolytic solution W that is directed out from the fluid outflow section 15. As a result, it is possible to increase the reaction force F from the workpiece 100 that is imparted to the tool body 10. In this manner, it is possible to easily increase the amount of displacement of the tool body 10 and to localize distribution of current density in a direction of curvature. It is thus possible to form the machined hole 101 as a curved hole that is bent.

On the other hand, by decreasing the outflow amount of the electrolytic solution W from the fluid outflow section 15, it is possible to reduce the above-described reaction force F and it is thus possible to easily form the machined hole 101 that has a small degree of curvature. Further, by stopping the supply of the electrolytic solution W to the second flow channel FC2, it is possible to form the machined hole 101 as a straight hole.

In this manner, by appropriately adjusting the amount of the electrolytic solution W supplied to the second flow channel FC2, it is possible to easily adjust the degree of curvature of the tool body 10. As a result, it is possible to machine the straight hole and the curved hole using the single electrochemical machining tool 3. In addition, when forming the machined hole, by appropriately adjusting the degree of curvature of the tool body 10, it is possible to form the machined hole 101 having a complex shape in which the straight hole and the curved hole are combined.

According to the electrochemical machining system 1 of the present embodiment, the flow channel FC is partitioned into two channels, namely, the first flow channel FC1 and the second flow channel FC2 by the inner tube member 17, and, by the second flow channel FC2 communicating with the fluid outflow section 15, it is possible to easily form the machined hole 101 of the desired shape, as the straight hole and the curved hole.

In the present embodiment, the inner tube member 17 is supported by the inner circumferential surface 11*a* of the electrode 11 by the ribs or the like, as described above. However, as long as it is possible to hold the inner tube member 17 in a state in which the inner circumferential surface 11*a* of the electrode 11 and the inner tube member 17 are separated from each other when the electrolytic solution W is caused to flow, a support structure such as the ribs need not necessarily be provided.

Second Embodiment

Next, an electrochemical machining system 21 according to a second embodiment of the present invention will be described. Note that structural elements that are the same as those of the first embodiment are assigned the same reference signs and a detailed explanation thereof is omitted herein.

In the present embodiment, the tool body 10 further includes a plug member 23 that is provided on the inner tube member 17 and that blocks the second flow channel FC2 at the tip end 10*a* of the tool body 10.

Figure 3:
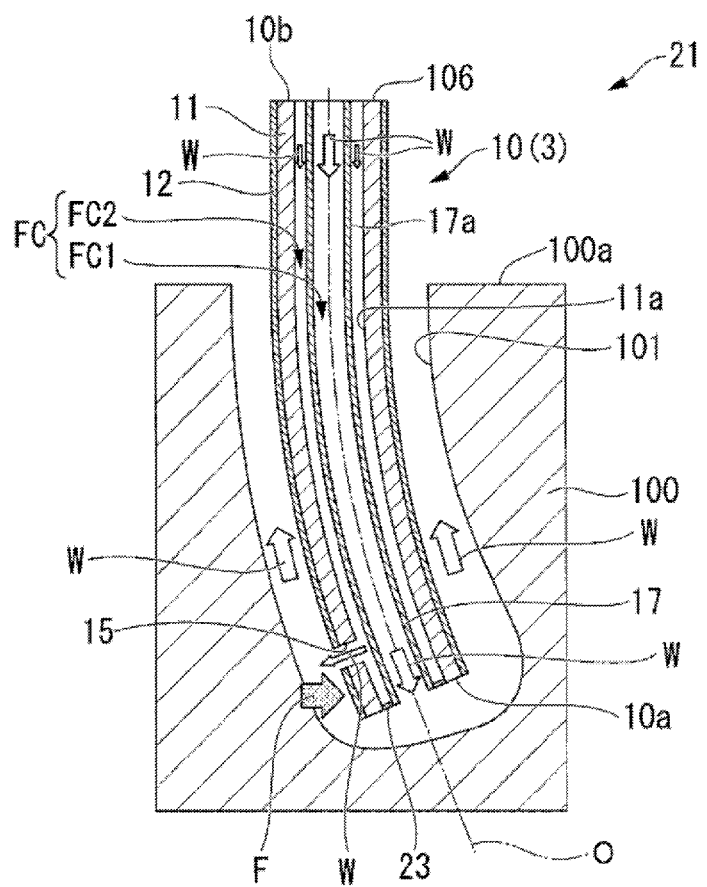
FIG. 3 is a longitudinal cross-sectional view illustrating an electrochemical machining tool in an electrochemical machining system according to a second embodiment of the present invention, and a workpiece.

As illustrated in FIG. 3, the plug member 23 is provided at the tip end 10*a* of the tool body 10 between the first flow channel FC1 and the inner circumferential surface 11*a* of the electrode 11. The plug member 23 is a ring-shaped blocking member that centers around the axial line O and prevents the outflow of the electrolytic solution W from the second flow channel FC2. Further, the plug member 23 is provided further to the side of the tip end 10*a* than the fluid outflow section 15. In other words, the fluid outflow section 15 is formed further to the base end 10*b* side than the plug member 23.

According to the electrochemical machining system 21 of the present embodiment, the second flow channel FC2 is blocked by the plug member 23 at the tip end 10*a*. As a result, it is possible to direct all of the electrolytic solution W to flow out from the fluid outflow section 15.

Therefore, by controlling the supply amount of the electrolytic solution W from the electrolytic solution supply part 6, the flow amount of the electrolytic solution W that flows outward in the radial direction from the fluid outflow section 15 is even more easily adjusted. As a result, it is possible to control the reaction force F to the hydrodynamic force that is imparted to the tool body 10 and thus the curved hole and the straight hole of the desired shape can be formed even more easily.

In the present embodiment, the plug member 23 is provided at the tip end 10*a* of the tool body 10, but it is not limited to this type of installation position, and it is sufficient if the plug member 23 is provided at least further to the side of the tip end 10*a* than the fluid outflow section 15. Namely, it is sufficient if the plug member 23 is provided such that all of the electrolytic solution W flowing through the second flow channel FC2 can be directed to flow out from the fluid outflow section 15. Further, the plug member 23 may be formed integrally with the inner tube member 17. In addition, in place of the plug member 23, the gap between the first flow channel FC1 and the second flow channel FC2 may be filled with a resin or the like, for example, such that the gap is blocked further to the tip end 10*a* side than the fluid outflow section 15.

Preferred embodiments of the present invention are explained in detail above, but some design modifications are possible without departing from the technical scope of the present invention.

For example, the electrode 11 may be exposed by forming a section on which the insulating layer 12 is not provided on the outer circumferential surface of the electrode 11 in a position separated by 180 degrees around the axial line O from the fluid outflow section 15. By adopting this type of structure, when the tool body 10 curves in response to the reaction force F, an electric current is caused to pass between the exposed section of the outer circumferential surface and the inner surface of the machined hole 101. Therefore, the electrolyzation of the machined hole 101 is accelerated on the side of the tool body 10 that is curved, and it is possible to form the curved hole more efficiently.

However, when the electrochemical machining tool 3 in which the exposed section of the electrode 11 on the outer circumferential surface of the electrode 11 is formed in this manner is used to form the straight hole, it is necessary to rotate the electrochemical machining tool 3 and there is a risk that at that time, the tip end 10a of the tool body 10 may vibrate and increase a frequency of short circuits at the exposed portion. On this point, as described in the present embodiment, by partitioning the flow channel FC into the first flow channel FC1 and the second flow channel FC2 and controlling the outflow amount of the electrolytic solution W from the fluid outflow section 15, it becomes easy to control the displacement of the tool body 10 and it is thus possible to reduce the frequency of short circuits when machining the straight hole.

INDUSTRIAL APPLICABILITY

According to the above-described electrochemical machining tool, electrochemical machining system and perforated member manufacturing method, a first flow channel and a second flow channel are partitioned in a tool body, and a fluid outflow section is caused to communicate with the second flow channel. As a result, it is possible to easily form a curved hole and a straight hole of a desired shape.

REFERENCE SIGNS LIST

1 Electrochemical machining system
3 Electrochemical machining tool
4 Movement mechanism
4a Holding part
5 Guide part
5a Guide hole
6 Electrolytic solution supply part
6a Electrolytic solution flow channel
10 Tool body
10a Tip end
10b Base end
11 Electrode
11a Inner circumferential surface
12 Insulating layer
15 Fluid outflow section
17 Inner tube member (flow channel partitioning part)
17a Outer circumferential surface
100 Workpiece
110a Tip end
101 Machined hole
O Axial line
W Electrolytic solution
FC Flow channel
FC1 First flow channel
FC2 Second flow channel
F Reaction force
21 Electrochemical machining system
23 Plug member

The invention claimed is:

1. An electrochemical machining tool comprising:
a tool body that includes
an electrode formed of a flexible electroconductive material in a tube shape that extends along an axial line, having an inside formed with a flow channel along which an electrolytic solution flows toward a tip end,
an insulating layer for covering an outer circumferential surface of the electrode such that the electrode is exposed at a tip end face, and
a flow channel partitioning part for partitioning the flow channel into a first flow channel that includes the axial line and a second flow channel that is positioned on an outer circumferential side of the first flow channel; and
a fluid outflow section for directing the electrolytic solution flowing through the second flow channel outward in a radial direction of the tool body, formed on a portion of the circumference of the tool body.

2. An electrochemical machining system comprising:
the electrochemical machining tool described in claim 1;
a guide part for guiding the electrochemical machining tool in a predetermined advancing direction with respect to a workpiece;
a movement mechanism for causing the electrochemical machining tool to advance; and
an electrolytic solution for supplying part that supplies the electrolytic solution independently to each of the first flow channel and the second flow channel.

3. A perforated member manufacturing method for forming a machined hole in a workpiece using the electrochemical machining tool described in claim 1.

4. The electrochemical machining tool according to claim 1, further comprising:
a plug part provided inside the electrode for blocking the second flow channel,
wherein
the fluid outflow section is formed further to a rear end side of the tool body than the plug part.

5. An electrochemical machining system comprising:
the electrochemical machining tool described in claim 4;
a guide part for guiding the electrochemical machining tool in a predetermined advancing direction with respect to a workpiece;
a movement mechanism for causing the electrochemical machining tool to advance; and
an electrolytic solution for supplying part that supplies the electrolytic solution independently to each of the first flow channel and the second flow channel.

6. A perforated member manufacturing method for forming a machined hole in a workpiece using the electrochemical machining tool described in claim 4.

* * * * *